May 5, 1970     R. E. CHRISTMAN     3,510,860
ALARM SYSTEM
Filed Nov. 25, 1966
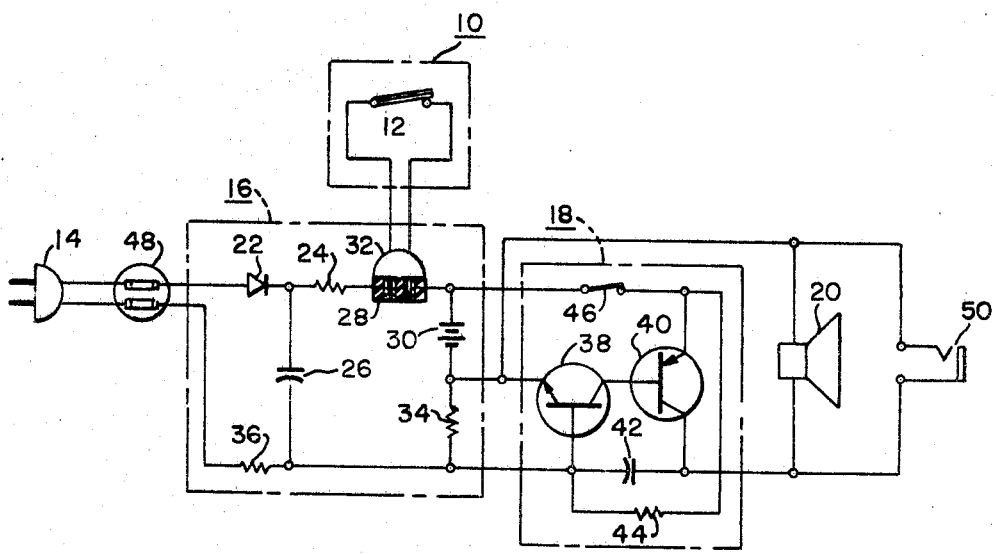
WITNESSES
Helen M. Farkas
James F. Young
INVENTOR
Ralph E. Christman
BY Edward C. Arey
ATTORNEY

United States Patent Office 3,510,860
Patented May 5, 1970

3,510,860
ALARM SYSTEM
Ralph E. Christman, Columbus, Ohio, assignor to Westinghouse Electric Corporation, Pittsburgh, Pa., a corporation of Pennsylvania
Filed Nov. 25, 1966, Ser. No. 597,011
Int. Cl. F25b 49/00; G08b 21/00; H02j 7/04
U.S. Cl. 340—227.1
2 Claims

ABSTRACT OF THE DISCLOSURE

A battery powered freezer failure alarm system in which the normal line power maintains the battery charged through a trickle charger, and a transistorized oscillator is biased to cut off during the charging. Time delay means are provided for preventing interruption of trickle charging current during momentary line power failures, and the temperature responsive switch has a circuit position between the time delay means and the battery to provide for immediate interruption of trickle charging current upon opening of the temperature responsive switch.

---

This invention relates generally to alarm systems, and in particular to an alarm system for signalling the failure of line power to a refrigerated storage device and for signalling a temperature rise of the storage space to a level requiring corrective action.

An object of the invention is the provision of an alarm system which: responds both to a failure of main line power and to a storage space temperature increase; is sufficiently inexpensive to be suitable for application to devices such as domestic freezers; permits convenient testing of the alarm system; and, avoids nuisance alarms from momentary loss of main power.

The main elements of an alarm system according to the invention include a line electrical power source for the system and for the refrigerating device, a rechargeable battery, a relaxation type oscillator circuit connected to be powered by the battery, the circuit including transistor means operable in a switching mode, signal means connected to the output of the oscillator circuit for energization by the oscillator, a trickle charger circuit for the battery normally energized by the line power source to maintain the battery fully charged, the trickle charger circuit being connected to the oscillator to also normally hold the transistor means in a bias cutoff region preventing operation of the oscillator, and normally closed switch means in the trickle charger circuit operative to an open position in response to a rise in storage temperature of the device to disable the trickle charger circuit so that the cutoff bias of the transistor means is removed and the oscillator is energized to operate the signal means.

The invention will be described in connection with the accompanying drawing in which the single figure is a schematic diagram of the alarm system.

In the drawing the dash line rectangle 10 indicates the refrigerated storage compartment to be cooled. The compartment contains a suitably placed, thermally responsive element 12 in the form of a switch which is normally closed at the normal low temperatures at which the compartment is held, and which opens in response to a rise in temperature above a predetermined level indicating a need for corrective action.

The principal parts of the failure alarm system include the plug 14 which is connected to a convenience outlet, a trickle charger and battery circuit encompassed by the dash line rectangle 16, a relaxation type oscillator enclosed within the dash line rectangle 18 and adapted to be powered by a battery, and the signal means such as a loudspeaker 20 connected to the output of the oscillator.

The trickle charger 16 circuit as shown in the drawing includes a diode 22 having one side connected to the one side of the line source plug 14 and its other side connected both to resistor 24 and capacitor 26. A jack 28 is provided in the line between the resistor 24 and the battery 30 so that the plug 32 must be inserted in the jack to connect thermally responsive switch 12 in series between the resistor 24 and the battery 30. A biasing resistor 34 has one side connected to the negative side of the battery and its opposite side connected to the capacitor 26. The trickle charging circuit also includes resistor 36 connected between the one side of the main power line and the normally negative sides of the capacitor 26 and biasing resistor 34.

The oscillator 18 is a transistorized relaxation type oscillator adapted to be powered by the low voltage battery 30 under a condition requiring the need of a signal to warn of a failure or impending failure of the refrigerated device. The illustrated oscillator has two transistors in a complementary arrangement to conserve battery power. It includes an NPN transistor 38 having its collector connected to the base of PNP transistor 40, a capacitor 42 connected between the base of transistor 38 and the collector of transistor 40, a resistor 44 having one side connected to the base of transistor 38 and the other side connected in common to the emitter of transistor 40 and a normally-closed, manually operable switch 46 connected between the positive side of the battery 30 and the emitter of the transistor 40. One side of loudspeaker 20 is connected in common to the collector of transistor 40 and the one side of capacitor 42, and the other side of the loudspeaker is connected to the common connection between the emitter of transistor 38 and the conductor connecting the negative side of the battery 30 to the one side of resistor 34.

The illustrated arrangement also includes a receptacle 48 between the line source plug 14 and the trickle charger 16, this receptacle being of a character which is adapted to receive the line plug of the refrigerated storage device with the line between the plug 14 and the trickle charger being completed only when the refrigerated storage device plug is inserted in the receptacle 48. A remote signal jack 50 is also shown in parallel with the speaker.

The general mode of operation of the system as shown is as follows. With the refrigerated storage device operating at its normal low temperature and with the alarm system energized from the line power source, the battery 30 is maintained at full charge by the trickle charger 16. Trickle charger current through the bias resistor 34 holds transistor 38 in the bias cutoff region. Accordingly, the oscillator is quiescent and the alarm is off. It will be appreciated that the plug 32 is in its normally inserted position in the jack 28, and that the thermally responsive switch 12 is in its normally closed position in response to the low temperature in the refrigerated storage device during this time. Accordingly, the alarm is off. A sufficient interruption in the trickle charging current to the battery 30, occurring because of a main line power failure, or opening of normally closed thermally responsive switch 12, or pulling of plug 32 from its jack 28, will cause the alarm to sound by removing the reverse bias from the transistor 38. To avoid nuisance alarms such as might occur due to momentary line power failure, the capacitor 26, resistor 24 and resistor 34 are selected to provide a sufficiently large time constant, such as 10 to 12 seconds to prevent the removal of the reverse bias from the transistor 38 during this period. It is noted that the provision of the thermally responsive switch in the line between the capacitor 26 and the battery 30 results in immediate interruption of the trickle charging current if the switch 12 opens due to an excessive temperature being reached whereas the main power plug 14 or the plug for receptacle 48 leading to the refrigerated storage device may be disconnected momentarily without an alarm sounding. The purpose of the switch 46 in the oscillator circuit is to permit stopping the signal after the alarm has sounded, and while normal conditions are being restored.

The specific way in which the system operates is as follows: Initially, both transistors are off. Transistor 38 is held off by the potential drop across resistor 34, caused by the trickle charging current. Since current flow through transistor 40 must also flow through transistor 38, transistor 40 is also held off. Removing charging current from resistor 34, by opening thermal switch 12 or removal of line voltage, removes the potential drop from resistor 34. Capacitor 42 is now free to charge through resistor 44 and loudspeaker 20, with a polarity reversal of resistor 34 and capacitor 42. The charge on capacitor 42 becomes sufficient to cause transistor 38 to turn on. Transistor 38 turns on transistor 40 which causes a potential drop across loudspeaker 20. The drop across loudspeaker 20 discharges capacitor 42 and turns off transistor 38. Capacitor 42 again charges through resistor 44 and loudspeaker 20. Thus, a repeating cycle is set up. The repetitive current flow causes loudspeaker 20 to vibrate at an audio rate in accordance with the values of capacitor 42 and resistor 44.

The following is given as an example of the values of the elements and their character to provide one satisfactorily operating embodiment. The thermally responsive switch 12 may be a bimetal element such as Northern Electric Company bimetal switch 15419. The diode may be a 1N3756, and the NPN transistor may be a 2N1302, and the PNP transistor 40 a 2N406. The battery may be of the sealed nickel cadmium cell type such as a Burgess CD5L which is a 1.25 volt battery with a 450 milliampere hour rating.

With this battery, a proper trickle charging current and proper biasing of the transistor 38 may be achieved with components in the trickle charging circuit having values as follows: resistor 24—120K ohms; resistor 34—3300 ohms; resistor 36—390K ohms; capacitor 26—10 microfarads. The values of the capacitor 42 and resistor 44 in the oscillator may be, respectively, 0.47 microfarad and 10K ohms.

An alternate circuit in which the system is isolated from the house power source by a step down transformer may also be used. The circuit is essentially the same with the transformer, such as a Woodward Schumacher No. 72P23A, interposed between receptacle 48 and the trickle charger, the value of resistor 24 changed to 10K ohms, capacitor 26 changed to 200 microfarads, and the resistor 36 deleted.

It will be appreciated from the foregoing that the system is of a relatively simple nature lending itself to low cost manufacture as well as low cost operation but without sacrificing the desirable degree of reliability. It lends itself to use with remote indicators, is substantially maintenance free, and permits relatively easy testing of operation. The selection of the proper time constant provides a time delay which reduces nuisance alarms, and the disabling switch in the oscillator circuit permits stopping the alarm easily when corrective action is being taken.

Having described my invention I claim:

1. An electrical power and temperature failure alarm system for a refrigerated storage device, comprising:
   a line electrical power source for the system and for the device;
   a rechargeable battery;
   a relaxation type oscillator circuit connected to be powered by said battery, said circuit including transistor means;
   signal means connected to the output of said oscillator circuit for energization by said oscillator;
   a trickle charger circuit for said battery normally energized by said line electrical power source, said circuit being connected to said oscillator circuit to normally hold said transistor means in a bias cutoff region preventing operation of said oscillators;
   normally closed switch means in said trickle charger circuit operative to an open position in response to a rise in storage temperature of said device to disable said trickle charger circuit so that said cutoff bias of said transistor means is removed and said oscillator is energized;
   said trickle charger circuit includes time delay means for preventing interruption of trickle charging current during momentary line power failures; and
   said normally closed switch means is provided in said trickle charger circuit between said time delay means and said battery to provide for immediate interruption of said trickle charging current upon opening of said switch.

2. In a system according to claim 1:
   said system includes a power receptacle for connecting said refrigerated storage device, said receptacle being normally open and being provided between said line electrical power source and said charger circuit so as to require a connection of said refrigerated storage device to permit energization of said trickle charger circuit.

References Cited

UNITED STATES PATENTS

| | | | |
|---|---|---|---|
| 3,260,063 | 7/1966 | Johnson | 62—126 |
| 3,284,787 | 11/1966 | Voigt et al. | 340—227 |
| 3,305,755 | 2/1967 | Walsh. | |
| 3,070,739 | 12/1962 | Hansen et al. | 307—252 |
| 3,320,473 | 5/1967 | Grafham | 340—248 X |

JOHN W. CALDWELL, Primary Examiner

P. PALAN, Assistant Examiner

U.S. Cl. X.R.

320—56; 307—66; 62—126, 129